(12) United States Patent
Shim et al.

(10) Patent No.: US 10,102,417 B2
(45) Date of Patent: Oct. 16, 2018

(54) MOBILE TERMINAL

(71) Applicant: LG ELECTRONICS INC., Seoul (KR)

(72) Inventors: Hongjo Shim, Seoul (KR); Hyunok Lee, Seoul (KR); Youngho Sohn, Seoul (KR); Soseul Jin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 15/461,986

(22) Filed: Mar. 17, 2017

(65) Prior Publication Data

US 2017/0372122 A1 Dec. 28, 2017

(30) Foreign Application Priority Data

Jun. 27, 2016 (KR) ........................ 10-2016-0080391

(51) Int. Cl.
*G06K 9/00* (2006.01)
*G06F 3/041* (2006.01)
*G06F 21/32* (2013.01)
*G06F 3/0481* (2013.01)

(52) U.S. Cl.
CPC ....... *G06K 9/00087* (2013.01); *G06F 3/0414* (2013.01); *G06F 21/32* (2013.01); *G06K 9/0002* (2013.01); *G06F 3/04817* (2013.01)

(58) Field of Classification Search
CPC .. G06K 9/0002; G06K 9/00087; G06K 9/228; G06F 21/32; G06F 3/0414; G06F 3/04817
USPC ........................................................ 382/124
See application file for complete search history.

(56) References Cited

U.S. PATENT DOCUMENTS

| 9,613,246 | B1 | 4/2017 | Gozzini et al. |
| 2013/0136321 | A1 | 5/2013 | Lee et al. |
| 2014/0359757 | A1 | 12/2014 | Sezan et al. |
| 2017/0285746 | A1* | 10/2017 | Kim ........................ G06F 3/016 |

OTHER PUBLICATIONS

European Patent Office Application Serial No. 17000878.3, Search Report dated Nov. 7, 2017, 5 pages.

* cited by examiner

*Primary Examiner* — Daniel Mariam
(74) *Attorney, Agent, or Firm* — Lee Hong Degerman Kang & Waimey

(57) ABSTRACT

The present invention provides a mobile terminal, including a terminal body having a case made of a metal, a finger scan unit disposed beneath the case and configured to detect a pressure level of external force and a fingerprint, and a controller configured to decide output intensity of an ultrasonic wave for detecting the fingerprint based on the pressure level, and to control the finger scan unit based on the output intensity.

11 Claims, 13 Drawing Sheets

(a)　　　　(b)　　　　(c)

MOBILE TERMINAL

CROSS-REFERENCE TO RELATED APPLICATION

Pursuant to 35 U.S.C. § 119(a), this application claims the benefit of an earlier filing date of and the right of priority to Korean Application No. 10-2016-0080391, filed on Jun. 27, 2016, the contents of which are incorporated by reference herein in its entirety.

BACKGROUND OF THE INVENTION

1. Field of the Invention

This specification relates to a mobile terminal having a finger scan unit for scanning a finger.

2. Background of the Invention

A mobile terminal refers to every device which includes a battery and a display unit, outputs information on the display unit using power fed from the battery, and is portable by a user. The mobile terminal includes a device that records and reproduces videos and a device that displays graphic user interfaces (GUIs), and examples of the mobile terminal include a notebook, a portable phone, glasses and watch capable of displaying screen information, a game machine and the like.

As it becomes multifunctional, a mobile terminal can be allowed to capture still images or moving images, play music or video files, play games, receive broadcast and the like, so as to be implemented as an integrated multimedia player. Many efforts include not only changes and improvement of structural components implementing a mobile terminal but also software improvement to support and improve functions of the terminal.

In recent time, as a mobile terminal performs various functions, electronic components for inputting a control command or outputting a signal are additionally provided in the mobile terminal. However, if an electronic component, such as a finger scan unit, which should be provided on an outer surface of the mobile terminal, is mounted, appearance of the mobile terminal becomes complicated.

SUMMARY OF THE INVENTION

To achieve these and other advantages and in accordance with the purpose of this specification, as embodied and broadly described herein, there is provided a mobile terminal including a terminal body having a case made of a metal, a finger scan unit disposed beneath the case and configured to detect a pressure level of external force and a fingerprint, and a controller configured to decide output intensity of an ultrasonic wave for detecting the fingerprint based on the pressure level, and to control the finger scan unit based on the output intensity.

In one embodiment disclosed herein, the mobile terminal may further include a display unit disposed on one area of the terminal body, and the controller may output an indicator for guiding to increase a pressure level for detecting the fingerprint or output an indicator for notifying a position of the finger scan unit when a remaining battery level is lower than a specific reference level. Therefore, a user can generate a fingerprint image with high quality by applying pressure of an appropriate level.

In one embodiment disclosed herein, the controller may execute a different function based on a pressure level of external force applied while the fingerprint is detected. This may allow the user to control the mobile terminal in a different manner by applying pressure of a different level while detecting the fingerprint.

According to the present invention, output intensity of an ultrasonic wave can be adjusted by using a detected pressure level. Therefore, when a user applies weak pressing (pushing) force, the intensity of the ultrasonic wave can increase to acquire a fingerprint image with high quality. Also, when the user applies strong pressing force, the intensity of the ultrasonic wave can decrease so as to reduce power consumption.

Also, a finger scan unit can be configured by a case made of a metal, which can develop a unity with the case and implement attractive appearance.

In addition, owing to a finger scan unit which detects pressure as well as a fingerprint, a specific function executed based on a detected fingerprint can be controlled in a different manner based on a detected different pressure level, thereby controlling more various functions.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
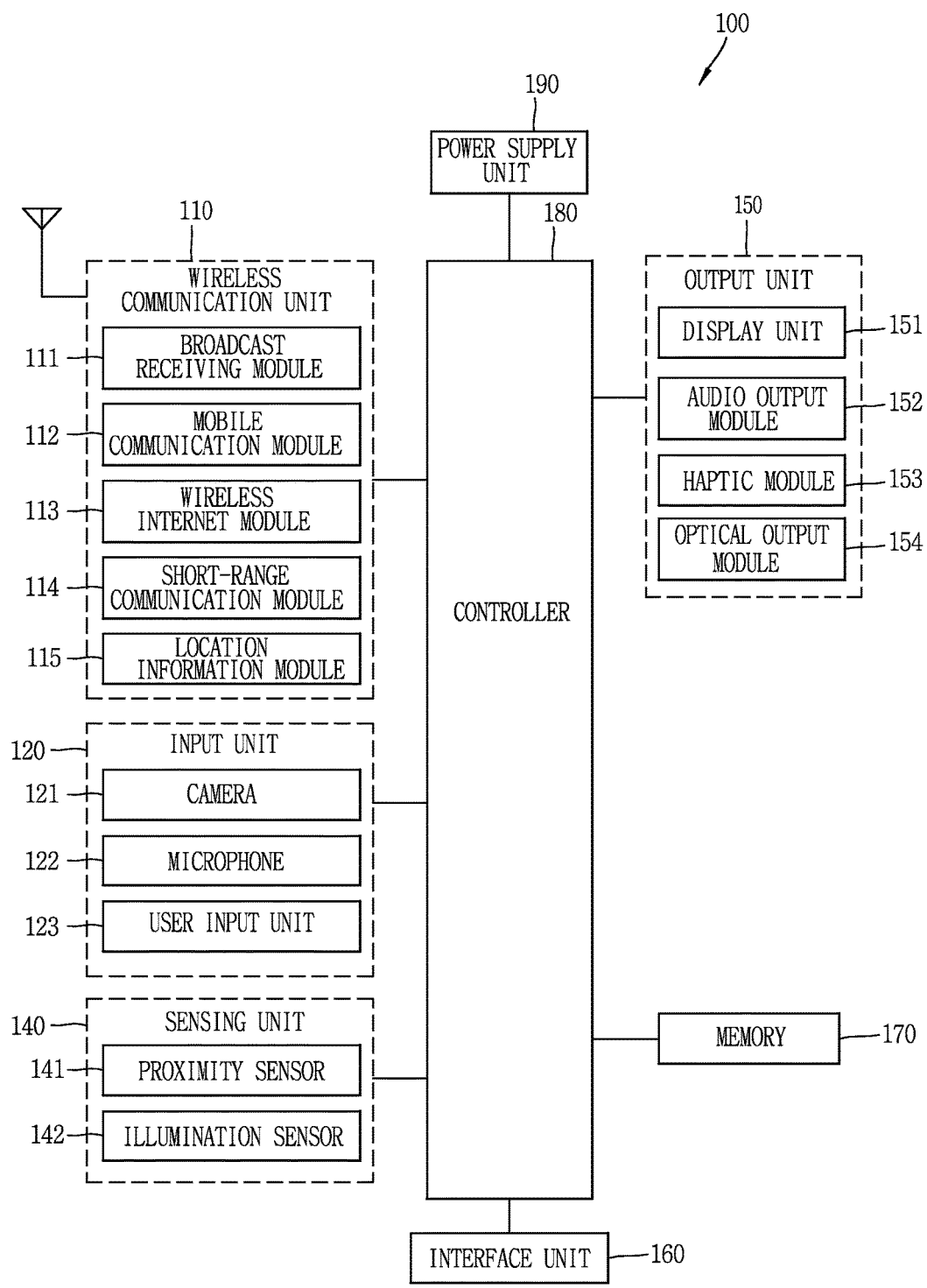
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1B:
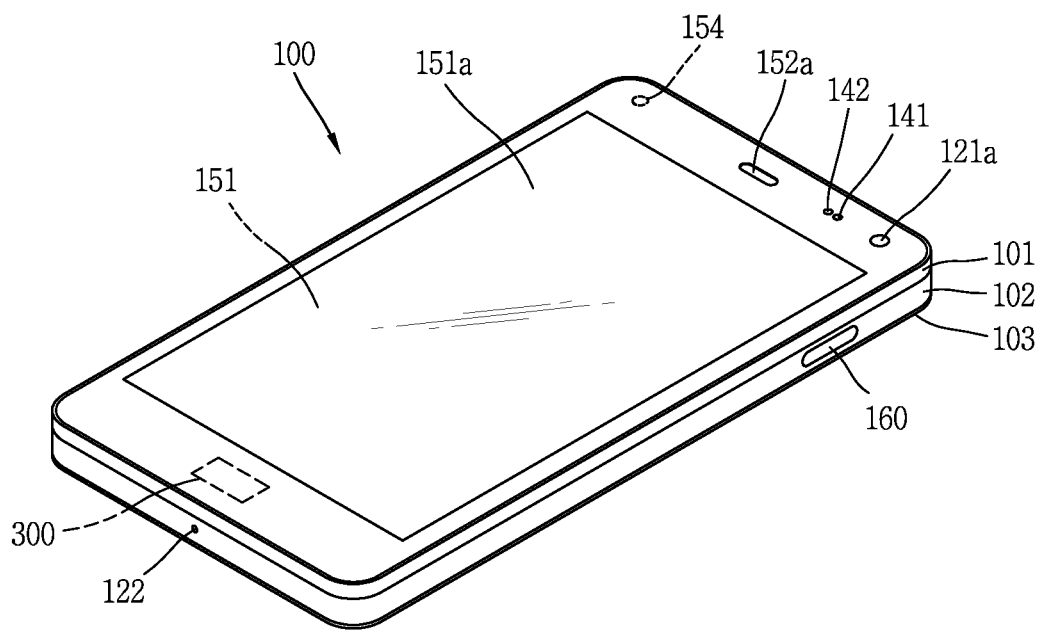
FIGS. 1B and 1C are conceptual views illustrating one example of the mobile terminal, viewed from different directions.
Figure 1C:
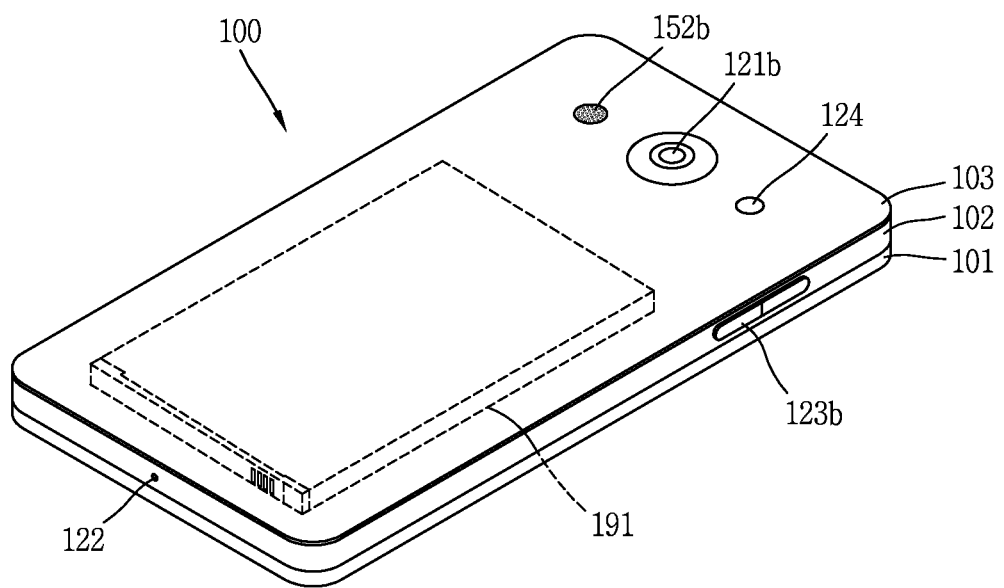

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs (information or signals) to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function (or an application program) being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, considering the mobile terminal 100 as at least one set, the terminal body may be understood as a conception referring to the set.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

FIGS. 1B and 1C depict certain components as arranged on the mobile terminal. However, it is to be understood that alternative arrangements are possible and within the teachings of the instant disclosure. Some components may be omitted or rearranged or arranged on a different surface. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side due to the touch screen or rear input unit replacing at least some functions of the first manipulation unit 123*a* provided on the front of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

The second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Referring to FIG. 1B, the mobile terminal 100 according to the present invention further includes a finger scan unit 300 that scans a user's finger. The finger scan unit 300 may be provided on the front case 101 which defines the appearance of the mobile terminal 100 and has a bezel portion that surrounds the display unit 151, or provided on one area of a window 151*a* of the display unit 151.

The finger scan unit 300 according to this embodiment is provided on the front case 101 which is made of a metal and surrounds the display unit 151. However, the position of the finger scan unit 300 is not limited to one area of the front case 101 defining the front surface of the mobile terminal 100. For example, the finger scan unit may alternatively be provided on one area of the rear case 102 defining the side surfaces of the mobile terminal 100 and/or one area of a battery cover defining the rear surface of the mobile terminal 100.

The finger scan unit 300 provided on the one area of the metal case may be flush with the other area without externally protruding or being recessed, thereby implementing simple appearance of the mobile terminal.

The finger scan unit according to the present invention generates a fingerprint image by outputting an ultrasonic wave, and decides output intensity of the ultrasonic wave based on pressure of external force while a user's finger is brought into contact therewith. Hereinafter, a configuration of the finger scan unit and a control method thereof will be described.

Figure 2A:
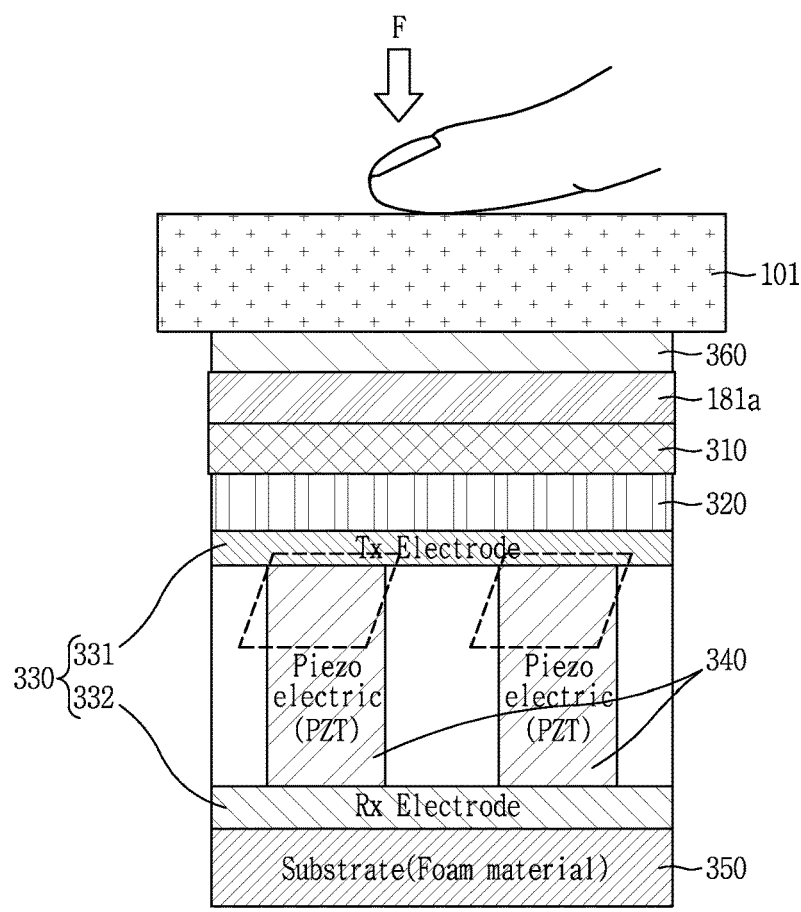
FIG. 2A is a conceptual view illustrating components of a finger scan unit in accordance with one embodiment of the present invention.
Figure 2B:
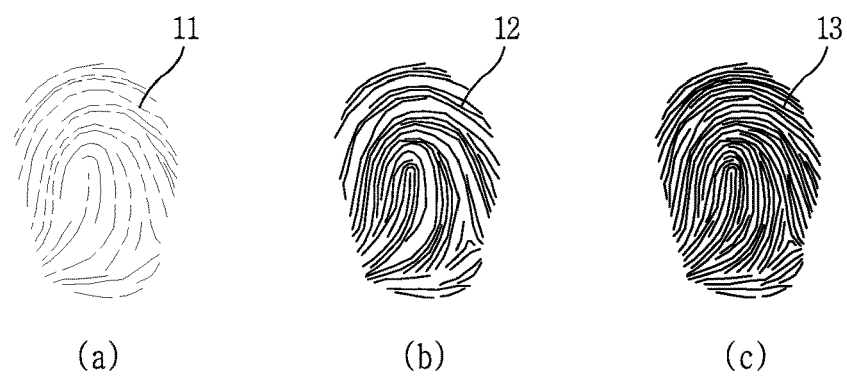
FIG. 2B is a conceptual view illustrating quality of a fingerprint image according to a pressure level when ultrasonic waves with the same output intensity are output.

FIG. 2A is a conceptual view illustrating components of a finger scan unit in accordance with one embodiment of the present invention, and FIG. 2B is a conceptual view illustrating quality of a fingerprint image according to a pressure level when an ultrasonic wave with the same output intensity is output.

As illustrated in FIG. 2A, a finger scan unit 300 according to this embodiment is provided on one area of the front case 101 which is made of a metal. The finger scan unit 300 includes a flexible printed circuit board (FPCB) 181*a*, a pressure sensing layer 310, a coating layer 320, an electrode portion 330, a piezoelectric element 340, and a base portion 350, which are sequentially arranged beneath the one area of the metallic front case 101. The FPCB 181*a* is attached on an inner surface of the front case 101 by an adhesive member 360.

The piezoelectric element 340 may be made of piezo materials. The piezoelectric element 340 may be arranged in plurality according to a width of the finger scan unit 300. The number of piezoelectric elements 340 are decided based on an interval between ridge and valley portions. A transmitting (TX) electrode 331 and a receiving (RX) electrode 332 are arranged with interposing the piezoelectric elements 340 therebetween. The piezoelectric elements 340 are vibrated up and down using a current output from the TX electrode 332, thereby generating an ultrasonic wave.

The ultrasonic wave, as aforementioned, is generated in response to upward and downward vibration of the piezoelectric elements 340. A fingerprint image is generated by using ultrasonic wave reflection which happens at a boundary of a finger and a boundary between an outer layer of a skin and a subsystem of a finger. A ridge portion of a finger that is brought into contact with the front case 101 and a valley portion of the finger that brought into contact with an air layer have different reflection characteristics. The fingerprint image is generated based on the difference of the reflection characteristic.

Referring to FIG. 2B, the fingerprint image is generated based on the reflection characteristic of the ultrasonic wave which is reflected from the finger. Therefore, when a finger is closer to the finger scan unit 300 to facilitate reaching of the ultrasonic wave, a clear fingerprint image with an improved reflection characteristic is generated. Regarding a first image 11, a second image 12 and a third image 13, a more clear and darker fingerprint image is generated when the finger is brought into contact with the front case 101 with a stronger force.

Or, in case where a finger is brought into contact with the front case 101 with substantially the same force, when a greater current is applied from the Tx electrode 331, a clear and dark fingerprint image, such as the third image 13, is generated.

The pressure sensing layer 310 measures a pressure level of external force applied onto the finger scan unit 300. The pressure sensing layer 310 is provided on the coating layer 320 and electrically connected to the FPCB 181*a*.

Accordingly, the finger scan unit according to this embodiment is controlled to output a different current according to a pressure level in a manner of measuring pressure of external force applied thereto. Hereinafter, description will be given of a method of controlling the finger scan unit 300 to apply a different current based on a measured pressure level.

Figure 3A:
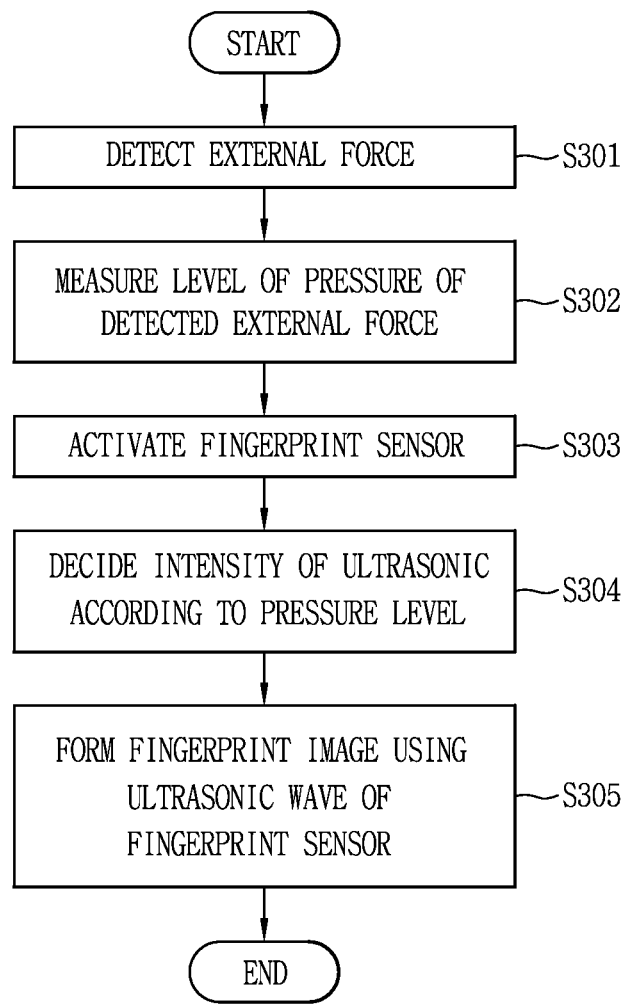
FIGS. 3A and 3B are conceptual views illustrating a method for controlling a mobile terminal in accordance with one embodiment of the present invention.
Figure 3B:
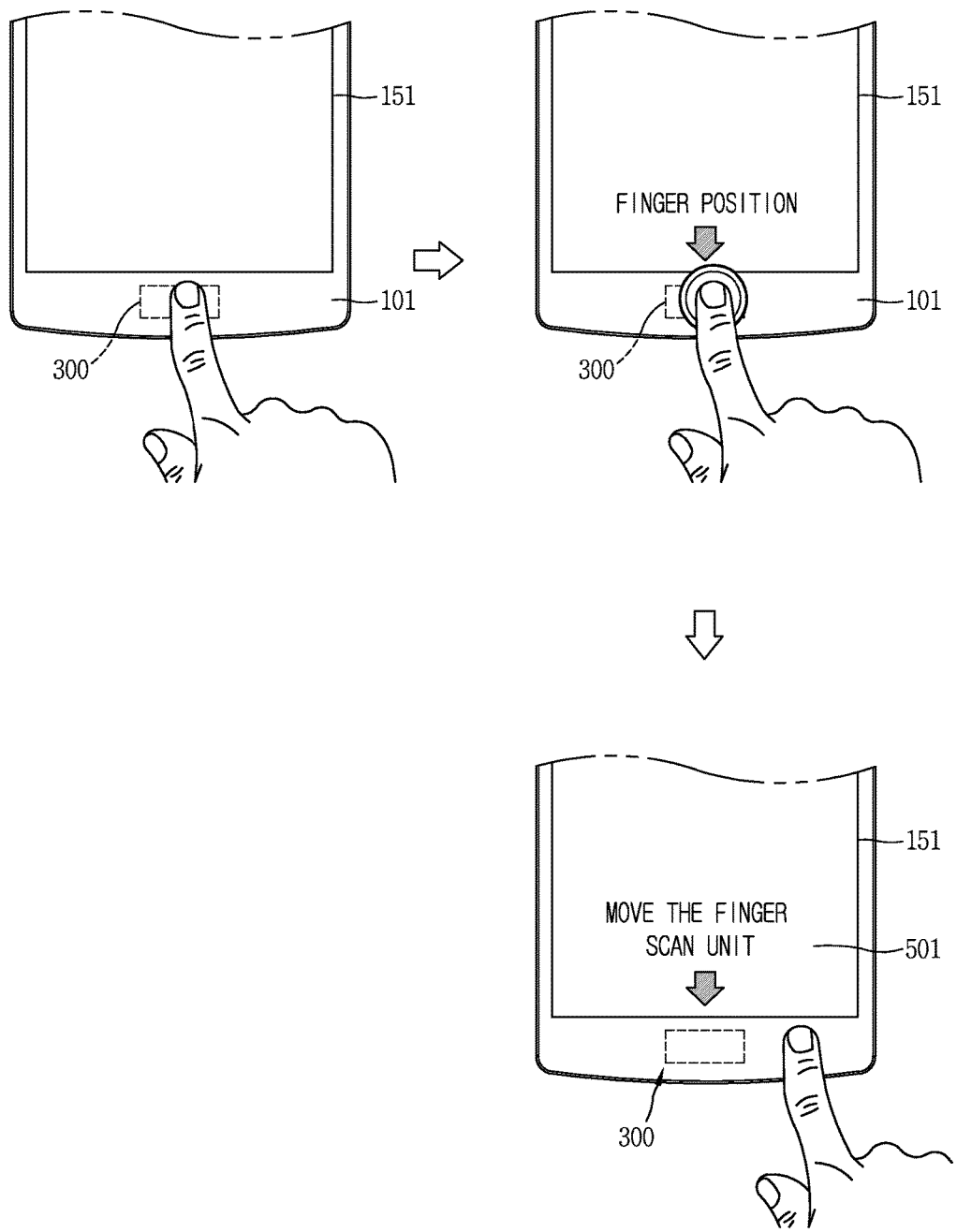

FIGS. 3A and 3B are conceptual views illustrating a method for controlling a mobile terminal in accordance with one embodiment of the present invention.

As illustrated in FIG. 3A, when external force is detected by the pressure sensing unit 310 (S301), the controller 180 measures a pressure level of the external force detected by the pressure sensing unit 310 (S302). For example, the pressure sensing unit 310 may detect the external force based on about 256 different levels.

When the external force detected by the pressure sensing layer 310 has a pressure level more than a specific reference pressure level, the controller 180 activates a finger scan function of the finger scan unit (S303). The controller 180 decides intensity of an ultrasonic wave according to the pressure level detected by the pressure sensing unit 310 (S304).

The controller 180 generates a fingerprint image by outputting an ultrasonic wave with the decided intensity (S305). When the pressure level is low, the controller 180 increases the output intensity of the ultrasonic wave. On the other hand, when the pressure level is high, the controller 180 lowers the output intensity of the ultrasonic wave. The controller 180 may preset the output intensity of the ultrasonic wave corresponding to the pressure level. The output intensity of the ultrasonic wave preset to correspond to the pressure level depends on quality of the fingerprint image.

That is, when the user contacts the finger scan unit 300 with a finger or the like by weak force, a clear fingerprint image may be output by increasing the intensity of the ultrasonic wave. On the other hand, when the user contacts the finger scan unit 300 with a finger or the like by strong force, a clear image can be output even by reducing the intensity of the ultrasonic wave to be relatively weak. This may result in reduction of power consumption.

Therefore, the user can be provided with a fingerprint image with quality maintained, and also unnecessary power consumption due to external force applied by the user can be reduced.

Referring to FIG. 3B, the finger scan unit 300 according to this embodiment is provided on the front case 101 that is made of a metal and surrounds the display unit 151. However, the position of the finger scan unit 300 is not limited to one area of the front case 101 defining the front surface of the mobile terminal 100. For example, the finger scan unit may alternatively be provided on one area of the rear case 102 defining the side surfaces of the mobile terminal 100 and/or one area of a battery cover defining the rear surface of the mobile terminal 100.

Referring to FIGS. 2A and 3B, when external force applied to the finger scan unit 300 is detected by the pressure sensing layer 310, the controller 180 controls the display unit 151 to output a first indicator 501*a* indicating a finger scan area. The first indicator 501*a* may be output on an area adjacent to the finger scan unit 300.

However, when pressure more than preset reference pressure is detected by the pressure sensing layer 310, the controller 180 does not output the first indicator 501*a* but outputs an ultrasonic wave with output intensity corresponding to the detected pressure level.

Meanwhile, when pressure lower than the preset reference pressure is detected by the finger scan unit 300 for a specific time, the controller controls the display unit 151 to output a second indicator 501*b* guiding a movement of a finger.

Accordingly, even without exposure of the finger scan unit 300 to outside of the metal case, a fingerprint can be input on an accurate position by virtue of the indicators output on the display unit 151.

Figure 3C:
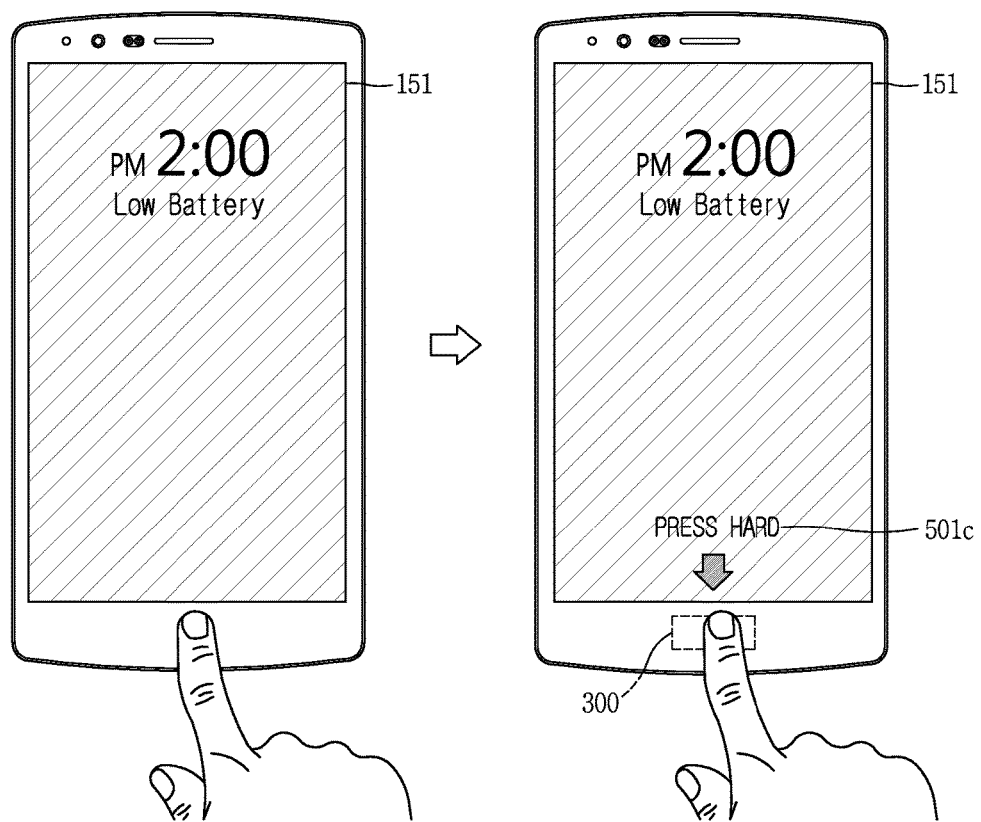
FIG. 3C is a conceptual view illustrating a control method of sensing a fingerprint (scanning a finger) in a low power state.

FIG. 3C is a conceptual view illustrating a control method of sensing a fingerprint (scanning a finger) in a low power state.

The controller 180 may limit the output intensity of the ultrasonic wave for the finger scan down to preset reference intensity in a low power state or a power-saving mode. Accordingly, when pressure less than the preset reference pressure is detected by the finger scan unit 300, the controller 180 controls the display unit 151 to output a third indicator 501*c*.

The third indicator 501*c* includes guide information informing that a fingerprint should be input by applying external force with pressure greater than the preset reference pressure. The third indicator 501*c* is preferably output on an area adjacent to the finger scan unit 300. The controller 180 may generate the fingerprint image by outputting an ultrasonic wave with low output intensity in a manner of applying low power when pressure greater than the reference pressure is detected.

Accordingly, even when a remaining battery level of the mobile terminal is low, a function according to such finger scan can be executed while extending a power-on state of the mobile terminal.

Figure 4A:
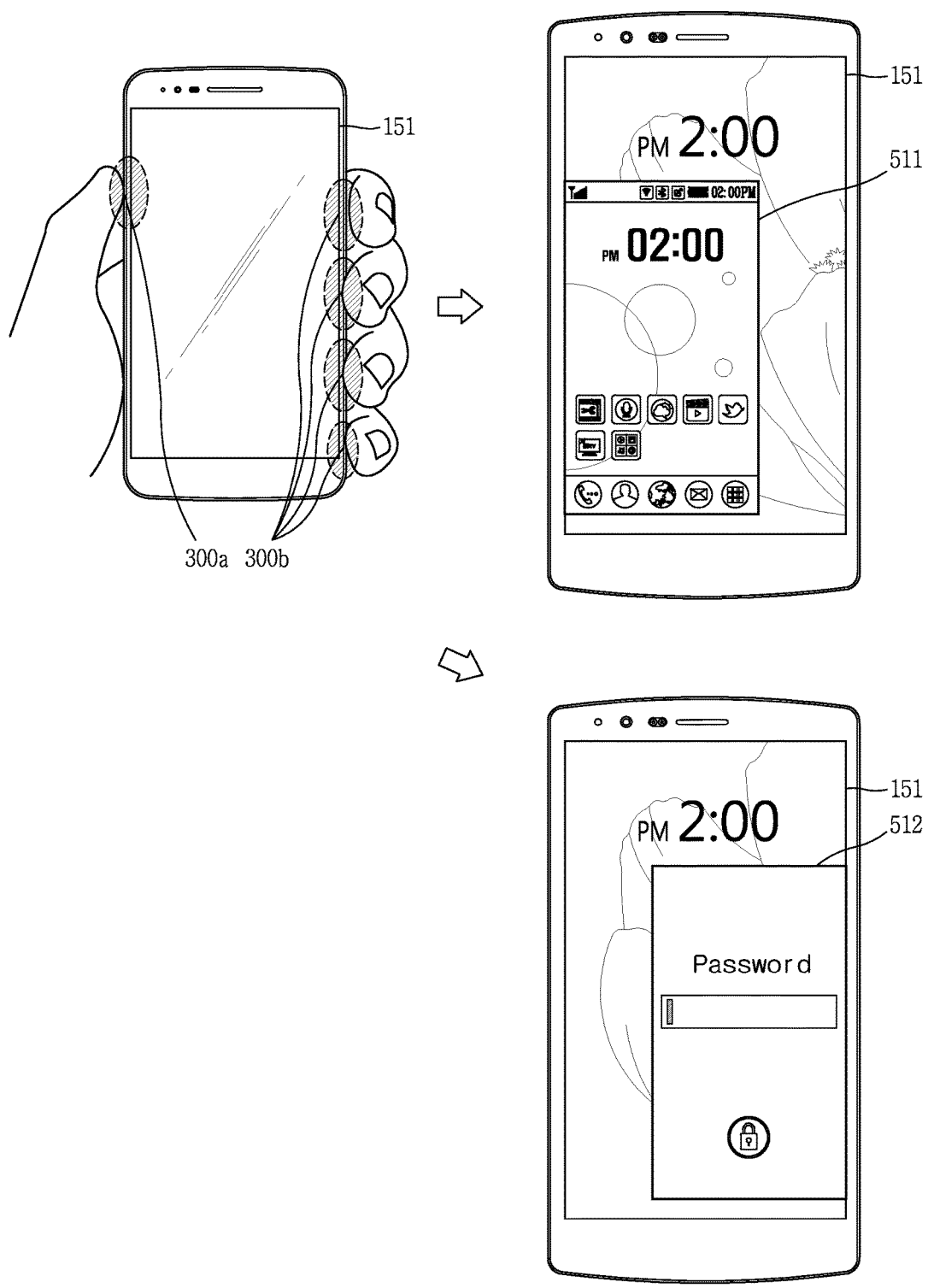
FIG. 4A is a conceptual view illustrating a function based on a position of a finger scan unit for scanning a finger.

FIG. 4A is a conceptual view illustrating a function based on a position of a finger scan unit for detecting a fingerprint.

The mobile terminal 100 according to FIG. 4A includes a first finger scan unit 300a provided on one side surface, and a second finger scan unit 300b provided on another side surface. The first and second finger scan units 300a and 300b may include a plurality of finger scan portions arranged in one direction.

The controller 180 compares fingerprint images detected by the first and second finger scan units 300a and 300b with prestored fingerprint images. For example, when a plurality of fingerprint images with respect to the user's fingers are stored, the controller 180 may compare the detected fingerprint images with the stored plurality of fingerprint images and thus perform different functions.

According to this embodiment, the controller 180 may release a lock state and controls the display unit 151 to output a home screen page when a fingerprint image prestored in the memory 170 is substantially the same as the fingerprint image scanned by the first finger scan unit 300a. Also, the controller 180 outputs a reduced screen 511' of the home screen page on a partial area of the display unit 151.

The reduced screen 511' is output on one area, adjacent to a position of a finger detected by the first finger scan unit 300a. That is, when a fingerprint image which is substantially the same as a fingerprint image which is stored with respect to the user's thumb is detected by the first finger scan unit 300a, the reduced screen 511' is output adjacent to the first finger scan unit 300a.

That is, when the display unit 151 is in an inactive state, the controller 180 activates the display unit 151. Even when the fingerprint image is different from the prestored fingerprint image, the controller 180 may activate the display unit 151 and output a different image.

In other words, since the reduced screen 511' is output on one area of the display unit 151 adjacent to the user's thumb, the user can apply a touch input to a content included in the reduced screen 511' merely with one hand.

However, a type of the reduced screen may not be limited to this, but may alternatively include an execution screen of a specific application, a virtual keyboard for inputting text, and the like. The controller 180 may control the display unit 151 to output the home screen page in replacement with the reduced screen 511' when a preset time elapses, a movement of the mobile terminal 100 is detected, a touch is applied to another area of the display unit 151, or the like.

Meanwhile, when the prestored fingerprint image does not match the fingerprint images detected by the first and second finger scan units 300a and 300b, the controller 180 maintains a lock state and controls the display unit 151 to output a lock screen 512. The lock screen 512 may include an input window for inputting a password, a guide window for guiding re-input of a fingerprint, or the like.

According to this embodiment, when a fingerprint is detected by the finger scan unit, the controller 180 switches an inactive state of the display unit 151 into an active state. Also, when the detected fingerprint image is substantially the same as the prestored fingerprint image, the controller 180 releases the lock state. In addition, specific screen information may be output on one area of the display unit 151 based on a detected position of a fingerprint, which may facilitate a manipulation of the screen information.

According to this embodiment, since screen information is output adjacent to a user's finger, the user can easily use the mobile terminal while gripping or holding the mobile terminal.

Figure 4B:
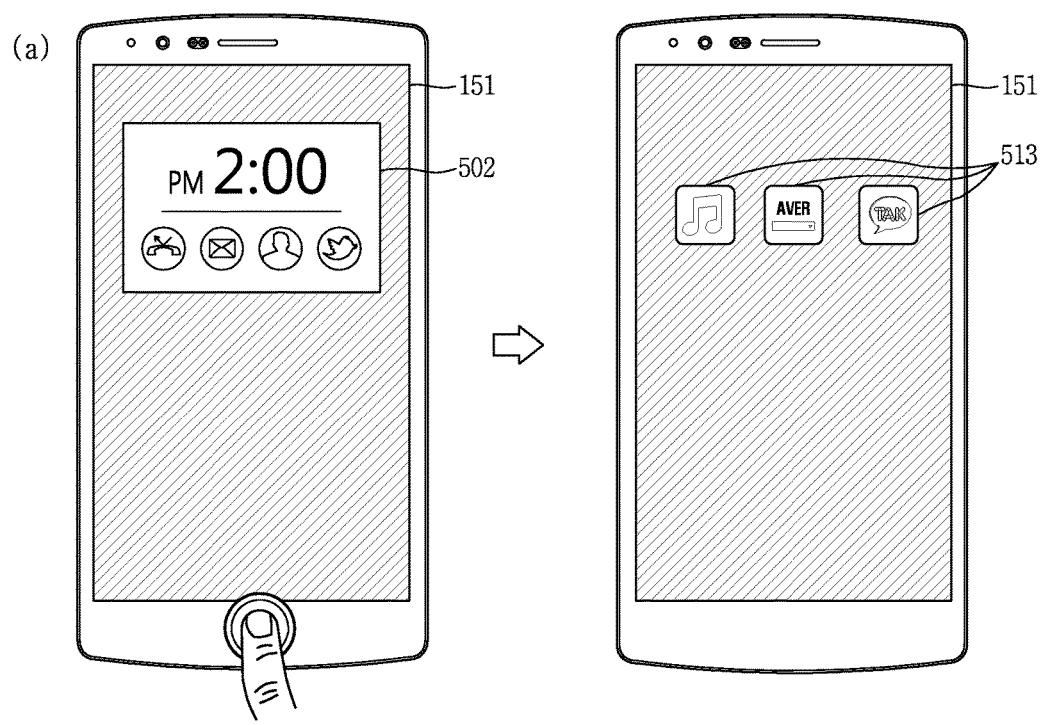
FIG. 4B is a conceptual view illustrating a function based on an applied pressure level.
Figure 4B:
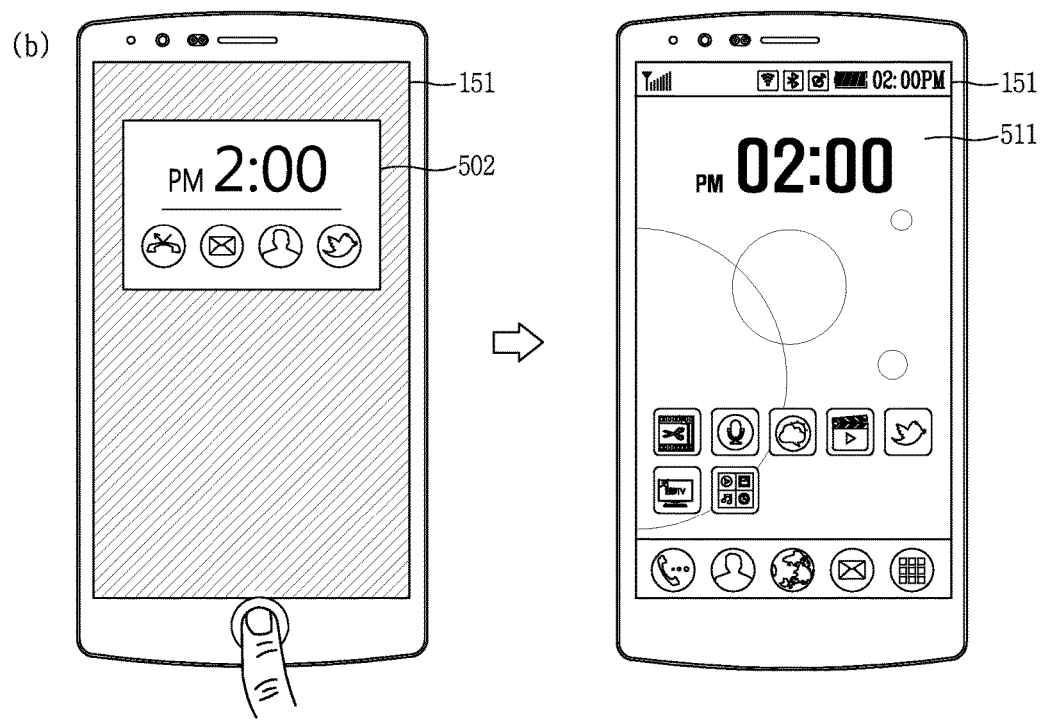

FIG. 4B is a conceptual view illustrating a function based on an applied pressure level.

Referring to FIG. 4B, the display unit 151 outputs status information 502 on one area thereof. In a state that specific screen information is not output on the display unit 151 based on a specific setting, the controller 180 may control the display unit 151 to continuously output the status information 502. The status information 502 may include a current time, a current date and generated event-related information.

When external force is applied to the finger scan unit 300 by pressure of a first level, the controller 180 executes a user authentication using a prestored fingerprint image and a detected fingerprint image. When the user authentication is completed, the controller 180 controls the display unit 151 to output screen information 513 which is preset by the user or includes contents of applications with high frequency of use. The controller 180 may output the screen information 513 on one area where the status information 502 is output. When a preset time elapses, the screen information 513 may be switched back into the status information 502. Or, the controller 180 may activate the full display unit 151 to output the screen information 513.

The screen information 513 may include an icon executing an application by receiving a touch input or information related to a received event. The controller 180 may output an execution screen of the application based on a touch applied to the screen information 513. Or, the controller 180 may output a window for executing one function of the application.

Meanwhile, when the authentication is not executed based on the detected fingerprint image, the controller 180 controls the display unit 151 to continuously output the status information 502. In this instance, the controller 180 may output vibration or audible data notifying non-matching of fingerprint information.

Meanwhile, when pressure of a second level different from the first level is detected, the controller 180 may activate the full display unit 151 to output a home screen page 511. The second level may be set as a value smaller than the first level.

When the pressure of the second level is detected and the user authentication based on the prestored fingerprint image and the detected fingerprint image is completely executed, the controller 180 releases the lock state and outputs the home screen page 511. Meanwhile, when the authentication procedure is not completed due to non-matching between the fingerprint image, which is obtained by detecting the pressure of the second level, and the prestored fingerprint image, the controller 180 may control the display unit 151 to output an authentication procedure screen which includes a password input window and the like.

According to this embodiment, a different function is executed, specifically, different screen information is output based on a pressure level which is detected while the user inputs a fingerprint. Especially, screen information for executing a more detailed function may be output in response to pressure of a higher level being applied, which may allow the user to fast control a different function by applying external force with a different pressure level that the user desires to apply.

Figure 5A:
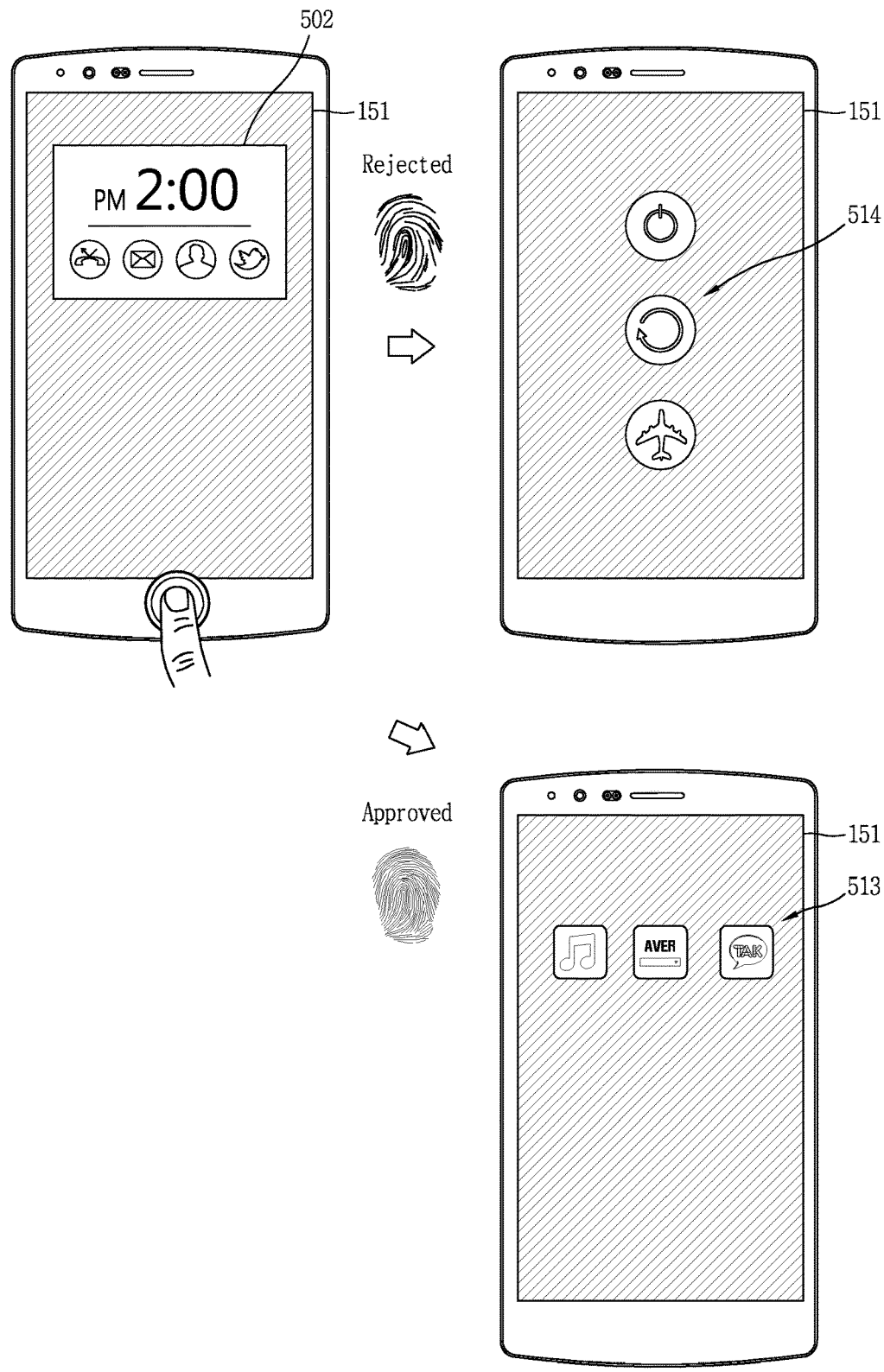
FIGS. 5A and 5B are conceptual views illustrating a control method using a fingerprint authorization procedure.
Figure 5B:
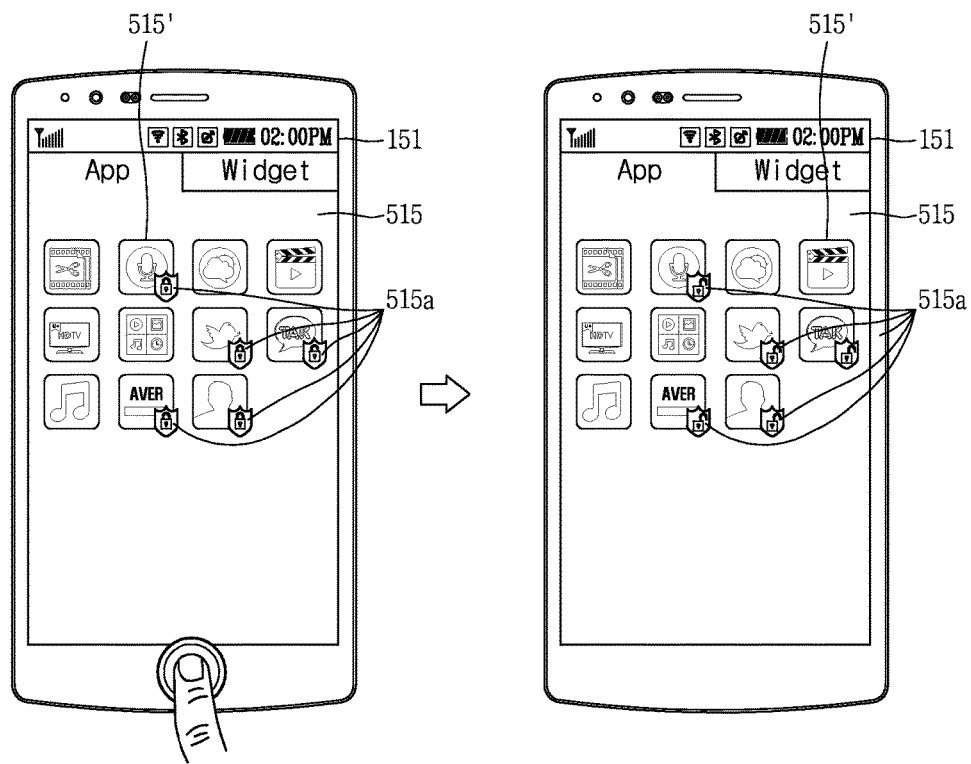

FIGS. 5A and 5B are conceptual views illustrating a control method using a fingerprint authorization procedure.

As illustrated in FIG. 5A, the display unit 151 outputs an operation state 502 on one area thereof. The operation state 502 may be output only on one area of the display unit 151 and the other area of the display unit 151 may be maintained in an inactive state.

When a fingerprint is detected by the finger scan unit 300 while the operation state 502 is output, the controller 180 decides whether or not the detected fingerprint matches the prestored fingerprint image.

When the fingerprint image detected by the finger scan unit 300 and the prestored user's fingerprint image do not match each other, the controller 180 controls the display unit 151 to output a graphic image 514 for controlling a power state of the mobile terminal. The graphic image 514 receives a touch input.

Meanwhile, when the fingerprint image detected by the finger scan unit 300 and the prestored user's fingerprint image match each other, the controller 180 completes the user authentication and controls the display unit 151 to output screen information 513 which is preset by the user or includes contents of applications with high frequency of use. When a touch input is applied to the screen information 513, the controller 180 may output an execution screen for controlling a corresponding application. That is, the controller 180 releases the lock state when the user authentication is completed.

Accordingly, the user executes the authentication procedure based on the user's fingerprint image in the lock state. When the authentication is failed, a specific function is executed. Therefore, a function appropriate for the user can be executed more fast and general functions can be executed for other persons except for the user.

Referring to FIG. 5B, the display unit 151 outputs a list screen 515 which includes icons 515' corresponding to one or more applications. The plurality of icons 515' are arranged based on a specific layout.

When the user authentication is needed for an execution of each application, namely, each application is in a lock state, the icon 515' corresponding to the application includes a first badge 515a indicating the lock state. The drawing illustrates that the first badge 515a is output on one area of each icon in an overlapping manner, but the present invention may not be limited to this. For example, a specific image or a specific color may be output on an edge of the icon. When a touch input is applied to the icon of the application in the lock state, the application is executed and an authentication function receiving a password is executed. Accordingly, the user can select one application, execute an authentication procedure and then execute and control the application.

When a fingerprint is detected by the finger scan unit 300, the controller 180 releases the lock states of the applications corresponding to the icons included in the list screen 515. Accordingly, each first badge 515a is switched into a second badge 515b indicating the release of the lock state.

While the second badge 515b is output, when a touch input is applied to the icon, the controller 180 may activate the application without the authentication procedure, and output an execution screen for controlling the application. This may allow the user to control a lock state of every application output on the list screen 515 at once.

Although not illustrated in detail, the controller may switch the release state back into the lock state when the list screen 515 is changed into another list screen 515 including icons of different applications, in response to a touch input applied to the list screen 515.

That is, the user can release the lock state of every application included in a list screen at once for using the applications, which may allow the user to access desired information more fast.

Figure 6A:
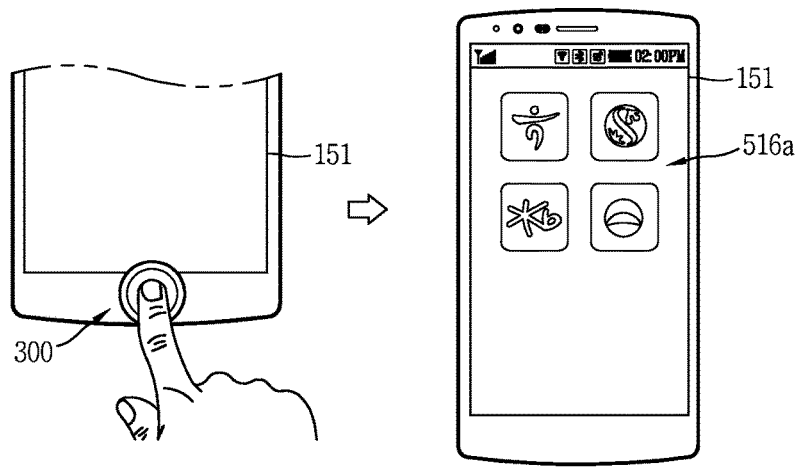
FIGS. 6A to 6C are conceptual views illustrating a characteristic of executing a different function according to applied pressure in accordance with another embodiment of the present invention.
Figure 6A:
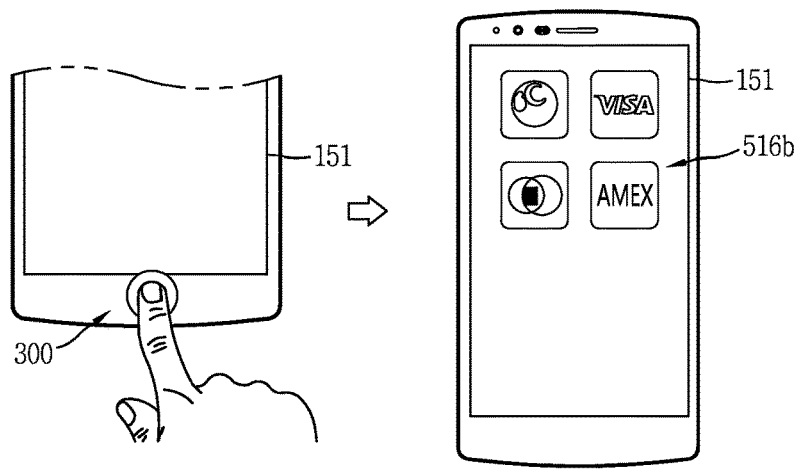
Figure 6A:
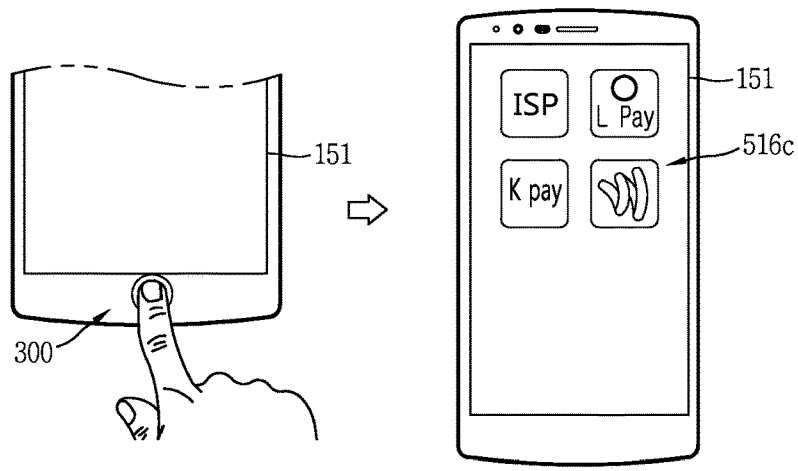
Figure 6B:
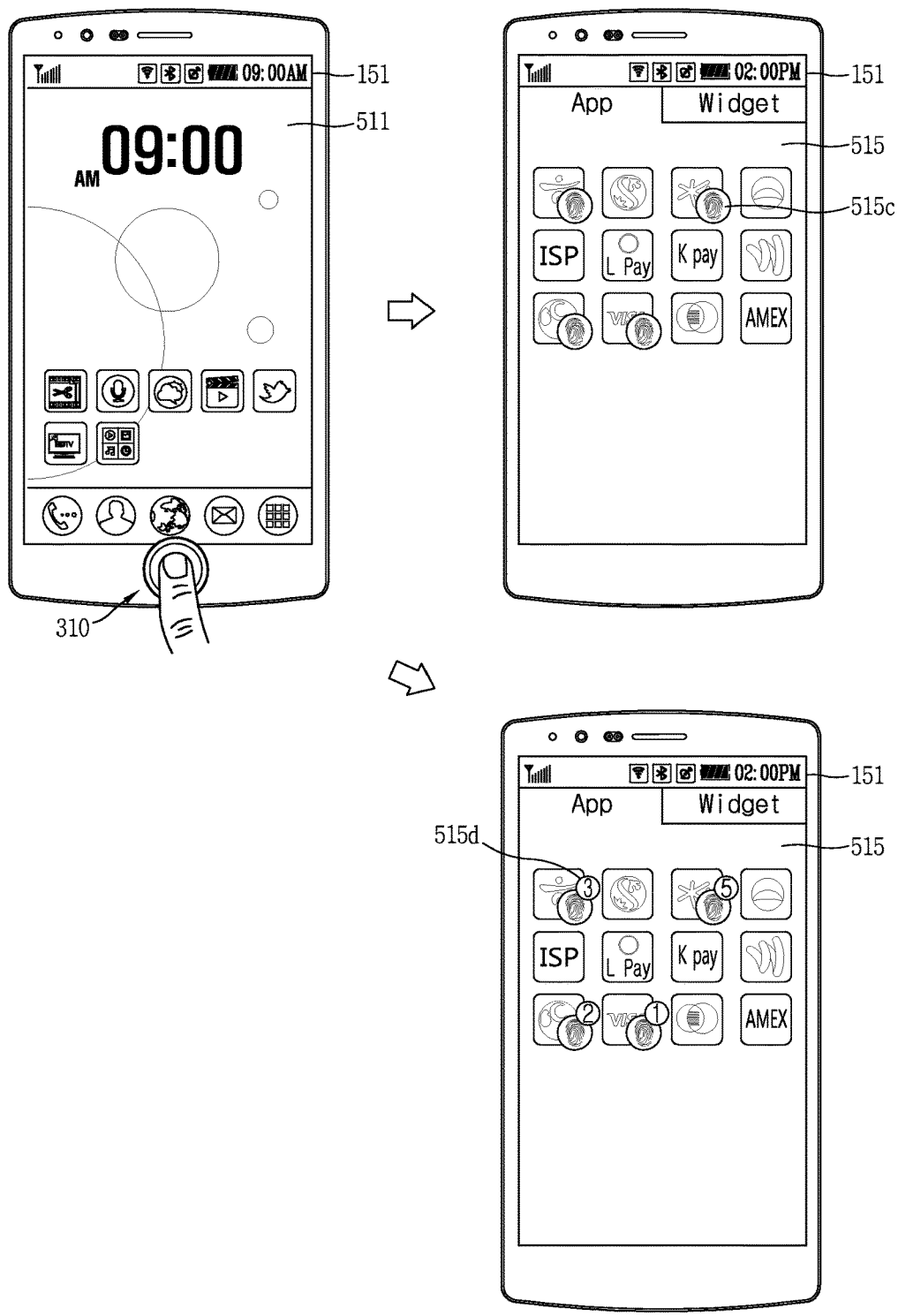
Figure 6C:
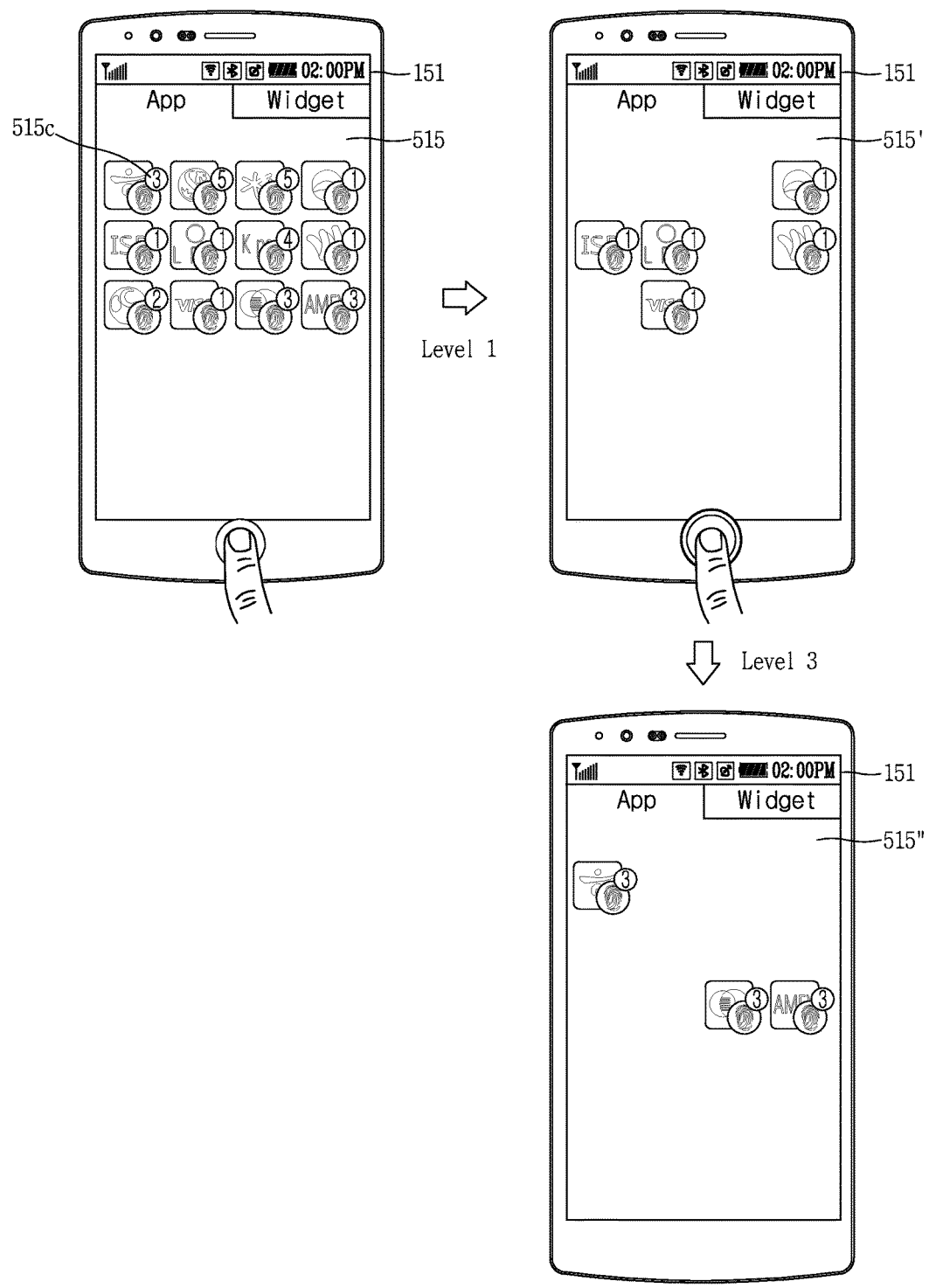

FIGS. 6A to 6C are conceptual views illustrating a characteristic of executing a different function according to applied pressure in accordance with another embodiment of the present invention.

As illustrated in FIG. 6A, the controller 180 controls the display unit 151 to output icons of applications which are classified into different categories on the basis of a pressure level.

When a fingerprint is detected by the finger scan unit 300 together with pressure of a first level, the controller 180 controls the display unit 151 to output first icons 516a of preset first applications. The first icons 511a may correspond to applications set by the user or applications which the user frequently uses.

Meanwhile, when pressure of a second level lower than the first level is applied, the controller 180 outputs second icons 516b of applications belonging to a specific category, among payment applications which are not frequently used. Each of the second icons 516b, for example, may correspond to an application executing an electronic payment using a credit card.

When pressure of third level lower than the second level is applied, the controller 180 may output icons 516c of applications which are not used or executed by the user among the plurality of applications. High or low intensities of the first to third levels may not be limited to the aforementioned.

According to this embodiment, a different application can be provided to the user by sensing pressure applied to the finger scan unit, and thus the user can be provided with an icon of a different application according to necessity.

As illustrated in FIG. 6B, the display unit 151 outputs screen information 515 which includes icons of applications installed on the mobile terminal 100, based on a specific control command. The icons are arranged based on a specific layout.

The display unit 151 outputs thereon third badges 515c, which indicate lock states of the applications, together with the icons. The applications which are output together with the third badge 515c are executed when a touch input is applied, and the display unit 151 may output authentication screens of the applications. For example, when a touch input with a pressure level lower than a preset reference pressure level is applied, the controller 180 maintains a state that the lock state is not released. Also, the controller 180 may not release the lock state when the fingerprint image detected by the finger scan unit 300 does not match a prestored user fingerprint image, and outputs icons of applications together with the third badge 515c.

Or, the controller 180 controls the display unit 151 to output the screen information 515 including the icons of the applications installed on the mobile terminal on the basis of the specific control command.

The display unit 151 outputs the icons of the applications in the lock state, together with a fourth badge 515d. The fourth badge 515d may release the lock state when a fingerprint is detected, and include information (number) related to a pressure level to be applied to the finger scan unit 300. Accordingly, when the user executes a fingerprint authentication by applying external force with a specific pressure level to the finger scan unit 300, the user can release the lock state of the application. This may result in releasing lock states of applications including information related to the same pressure level.

The user may set a condition for releasing a lock state of an application to a different pressure level. The lock states of applications which include the same pressure level as the release condition may be released at once while the screen information 515 is output.

Referring to FIG. 6C, the display unit 151 outputs thereon screen information 515 including icons of applications, together with the fourth badge 515d including pressure level information.

When a fingerprint is detected together with pressure of a first level, the controller 180 controls the display unit 151 to output a first selection window 515' which includes only icons of applications corresponding to the pressure of the first level. In this instance, the controller 180 may release lock states of the applications corresponding to the output icons at the same time.

Also, when a specific time elapses or the specific control command is applied again, the initially-output screen information 515 may be output again.

Meanwhile, when a fingerprint is detected together with pressure of a third level, the controller 180 may control the display unit 151 to output a second selection screen 515" including only icons of applications corresponding to the pressure of the third level.

The lock states of the applications corresponding to the icons included in the second selection screen 515" are released, and the user can immediately execute an application by applying a touch input to the corresponding icon included in the second selection screen 515".

According to these embodiments, the user can selectively release lock state of desired applications using pressure level information of a badge which is output together with icons.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
 a terminal body having a case comprising metal;
 a finger scan unit located relative to an inner side of the case, wherein the finger scan unit is configured to measure pressure of an external force applied to an outer side of the case and to detect a fingerprint of a finger contacting the outer side of the case; and
 a controller configured to:
 identify an output intensity of an ultrasonic wave for detecting the fingerprint based on an amount of the measured pressure; and
 control the finger scan unit to perform the detecting of the fingerprint based on the identified output intensity of the ultrasonic wave.

2. The mobile terminal of claim 1, wherein the finger scan unit comprises:
 a piezoelectric sensor located between a transmitting (Tx) electrode and a receiving (Rx) electrode and being configured to output the ultrasonic wave; and
 a pressure sensing layer located between the piezoelectric sensor and an area of the case to perform the measuring of the pressure of the external force.

3. The mobile terminal of claim 2, wherein the controller is further configured to:
 control the Tx electrode to reduce an amount of output current relative to an initial amount of current when the amount of the measured pressure amount is higher than a threshold value.

4. The mobile terminal of claim 2, wherein the controller is further configured to:
 control the Tx electrode to adjust an amount of output current in a manner that is inversely related to changes in the amount of the measured pressure.

5. The mobile terminal of claim 2, wherein the controller is further configured to:
 activate the Tx electrode, the Rx electrode, and the piezoelectric sensor, when the amount of the measured pressure exceeds a threshold value.

6. The mobile terminal of claim 1, further comprising:
 a display coupled to the body, and wherein the controller is further configured to:
 cause the display to an indicator for guiding a user to increase the pressure of the external force to facilitate the detecting of the fingerprint, when a remaining battery amount is lower than a threshold value.

7. The mobile terminal of claim 1, further comprising:
 a display coupled to the body, and wherein the controller is further configured to:
 execute any of a plurality of different functions according to a corresponding amount of the measured pressure of the external force applied during the detecting of the fingerprint.

8. The mobile terminal of claim 7, wherein the controller is further configured to:
 cause the display to display screen information including contents associated with a preset application when the measured pressure exceeds a first amount and the fingerprint is detected; and
 cause the display to display home screen including a plurality of icons when the measured pressure is less than a second amount and the fingerprint is detected, wherein the second amount is less than the first amount.

9. The mobile terminal of claim 8, wherein the controller is further configured to:
 release a lock state when the detected fingerprint matches a fingerprint of an authenticated user.

10. The mobile terminal of claim 1, further comprising:
 a display coupled to the body, and wherein the controller is further configured to:
 cause the display to display a plurality of icons, each associated with an application;
 cause the display to display an indicator in association with those icons among the plurality of icons which are in a locked state, wherein the indicator indicates that the application associated with the icon is in the locked state; and release the lock state of the application of at least one icon when the detected fingerprint matches a fingerprint of an authenticated user.

11. The mobile terminal of claim 1, further comprising:
a display coupled to the body, wherein the finger scan unit comprises a plurality of finger scan portions arranged on different areas of the terminal body, and wherein the controller is further configured to:
cause the display to display screen information at an area of the display that is located adjacent a finger scan portion, among the plurality of finger scan portions, used for the detecting of the fingerprint.

* * * * *